United States Patent
Kleeberger et al.

(10) Patent No.: US 12,254,254 B2
(45) Date of Patent: Mar. 18, 2025

(54) CIRCUITS AND TECHNIQUES FOR PREDICTING FAILURE OF CIRCUITS BASED ON STRESS ORIGINATION METRICS AND STRESS VICTIM EVENTS

(71) Applicant: Infineon Technologies AG, Neubiberg (DE)

(72) Inventors: Veit Kleeberger, Munich (DE); Rafael Zalman, Markt Schwaben (DE); Georg Georgakos, Erding (DE); Dirk Hammerschmidt, Villach (AT); Bernhard Gstoettenbauer, Engerwitzdorf (AT); Ludwig Rossmeier, Dorfen (DE); Thomas Zettler, Hoehenkirchen-Siegertsbrunn (DE)

(73) Assignee: Infineon Technologies AG, Neubiberg (DE)

( * ) Notice: Subject to any disclaimer, the term of this patent is extended or adjusted under 35 U.S.C. 154(b) by 771 days.

(21) Appl. No.: 17/457,216

(22) Filed: Dec. 1, 2021

(65) Prior Publication Data
US 2023/0169250 A1  Jun. 1, 2023

(51) Int. Cl.
G06F 30/3308 (2020.01)
G01R 31/26 (2020.01)
(Continued)

(52) U.S. Cl.
CPC ...... *G06F 30/3308* (2020.01); *G01R 31/2642* (2013.01); *G01R 31/27* (2013.01); *G06F 11/008* (2013.01); *G06F 30/33* (2020.01); *G06F 30/333* (2020.01); *G06F 30/367* (2020.01); *G06F 2119/02* (2020.01); *G06F 2119/18* (2020.01)

(58) Field of Classification Search
CPC ... G01R 31/2642; G01R 31/27; G06F 11/008; G06F 30/33; G06F 30/3308; G06F 30/333; G06F 30/367; G06F 2119/02; G06F 2119/18
USPC .............. 716/52, 53, 112, 136, 104; 703/16; 702/183, 185; 714/30, 33, 733, 734
See application file for complete search history.

(56) References Cited

U.S. PATENT DOCUMENTS 7,246,291 B2 * 7/2007 Hong .................... G11C 29/54
714/741
7,277,822 B2 * 10/2007 Blemel .................... F17D 5/02
324/543

(Continued)

FOREIGN PATENT DOCUMENTS

| EP | 3502720 A1 * | 6/2019 | ......... G01R 31/2856 |
| JP | 2014235060 A * | 12/2014 | |
| WO | WO-2020240680 A1 * | 12/2020 | .......... G06F 11/0709 |

OTHER PUBLICATIONS

Automotive Electronics Council, "Failure Mechanism Based Stress Test Qualification for Integrated Circuits", Automotive Electronics Council, Sep. 11, 2014, 48 pp.

(Continued)

*Primary Examiner* — Phallaka Kik
(74) *Attorney, Agent, or Firm* — Shumaker & Sieffert, P.A.

(57) ABSTRACT

In some examples, a method of operating a circuit is described. The method may include performing a circuit function and estimating a probability of failure of the circuit based on one or more stress origination metrics, one or more stress victim events, and one or more initial state conditions.

22 Claims, 6 Drawing Sheets

(51) Int. Cl.
    *G01R 31/27* (2006.01)
    *G06F 11/00* (2006.01)
    *G06F 30/33* (2020.01)
    *G06F 30/333* (2020.01)
    *G06F 30/367* (2020.01)
    *G06F 119/02* (2020.01)
    *G06F 119/18* (2020.01)

(56) References Cited

U.S. PATENT DOCUMENTS

| | | | |
|---|---|---|---|
| 9,465,373 B2 | 10/2016 | Allen-Ware et al. | |
| 10,250,029 B2 | 4/2019 | Carletti et al. | |
| 10,699,041 B2 | 6/2020 | Hammerschmidt | |
| 2005/0154561 A1* | 7/2005 | Legault | G06F 11/008 702/183 |
| 2005/0251718 A1* | 11/2005 | Hong | G01R 31/318342 714/738 |
| 2008/0256383 A1* | 10/2008 | Bose | G06F 11/008 714/1 |
| 2008/0301597 A1* | 12/2008 | Chen | G01R 31/2894 716/136 |
| 2009/0198470 A1* | 8/2009 | Lantieri | G01M 7/02 702/113 |
| 2012/0232685 A1* | 9/2012 | Wang | B22D 46/00 700/98 |
| 2014/0068298 A1 | 3/2014 | Simeral | |
| 2014/0312873 A1 | 10/2014 | Raja et al. | |
| 2016/0371413 A1* | 12/2016 | Bickford | G06F 30/398 |
| 2017/0292832 A1* | 10/2017 | Penjovic | G01B 11/08 |
| 2019/0187204 A1* | 6/2019 | Doescher | G01R 31/2856 |
| 2019/0354419 A1* | 11/2019 | Matsumoto | G06F 11/0754 |
| 2021/0074366 A1* | 3/2021 | Horisaki | G11C 29/06 |
| 2021/0383035 A1* | 12/2021 | Radaelli | G06F 30/20 |
| 2022/0076146 A1* | 3/2022 | Hong | G06N 20/00 |
| 2022/0214936 A1* | 7/2022 | Le | G06N 5/01 |
| 2022/0283889 A1* | 9/2022 | Shintani | G06F 11/0736 |
| 2024/0377453 A1* | 11/2024 | Coyne | G01N 27/041 |

OTHER PUBLICATIONS

IEC, "Reliability data handbook—Universal model for reliability prediction of electronics components, PCBs and equipment", International Electrotechnical Commission, First edition, Received on Sep. 15, 2021, 96 pp.

Jenkins et al., "On-chip circuit to monitor long-term NBTI and PBTI degradation," Microelectronics Reliability, Elsevier, accepted Jul. 10, 2013, 5 pp.

Ritter et al., "Aging sensors for on-chip metallization of integrated LDMOS transistors under cyclic thermo-mechanical stress," Microelectronics Reliability, Elsevier, accepted Jun. 6, 2017, 5 pp.

Ritter et al., "Resistance change in on-chip aluminum interconnects under cyclic thermo-mechanical stress," Microelectronics Reliability, Elsevier, Jun. 7, 2019, 5 pp.

U.S. Appl. No. 16/915,794, filed Jun. 29, 2021, naming inventors De Gasperi et al.

U.S. Appl. No. 17/457,166, filed Dec. 1, 2021, naming inventors Gstoettenbauer et al.

U.S. Appl. No. 17/457,183, filed Dec. 1, 2021, naming inventors Zettler et al.

U.S. Appl. No. 17/457,198, filed Dec. 1, 2021, naming inventors Rossmeier et al.

U.S. Appl. No. 17/457,207, filed Dec. 1, 2021, naming inventors Hammerschmidt et al.

U.S. Appl. No. 17/457,221, filed Dec. 1, 2021, naming inventors Georgakos et al.

* cited by examiner

CIRCUITS AND TECHNIQUES FOR PREDICTING FAILURE OF CIRCUITS BASED ON STRESS ORIGINATION METRICS AND STRESS VICTIM EVENTS

TECHNICAL FIELD

This disclosure relates to semiconductor circuits, and more specifically, circuits and technique for assessing and managing semiconductor circuits during use.

BACKGROUND

Semiconductor circuits are used in a wide variety of circuit applications in order to perform any of a variety of circuit functions. Unfortunately, semiconductor circuits can degrade over time. For example, aging, environmental exposure, stress, or other conditions can lead to semiconductor degradation and possibly end-of-life circuit failure, which is undesirable. The amount of stress conditions applied to semiconductor circuits strongly varies from case to case. As a result, the actual operational lifetime of a semiconductor circuit may be unpredictable.

In many situations, semiconductor circuits may be designed to tolerate an assumed worst-case mission profile during the lifetime of a system into which circuit will be installed (e.g., a vehicle). Typically, only a small percentage of devices will ever actually be exposed to the worst-case mission profile. Consequently, many semiconductor circuits are overdesigned with respect to their actual mission profile, which can increase production costs associated with the semiconductor circuits.

Sometimes, in unforeseeable exceptional cases, which may be caused by failures of within a larger system (e.g., a vehicle), even the worst-case mission profile can be exceeded, and a circuit may reach its end of life earlier than expected, due to the excessive stress exposure. Such situations of excessive circuit life degradation may occur even if the circuit does not directly fail in the situation where the stress actually occurs. For vehicle circuits, examples for such exceptional erroneous conditions may include overheating of the engine due to loss of cooling fluid or massive electromagnetic exposure due to coupling between another faulty system component, which may cause high transients in a wiring harness.

SUMMARY

This disclosure describes techniques and circuits for assessing aging effects in circuits and predicting future problems in circuits before the problems occur. The described circuits and techniques may estimate a probability of failure of the circuit based on data associated with the circuit. The data, for example, may include one or more stress origination metrics associated with the circuit, one or more stress victim events associated with the circuit, and one or more initial state conditions associated with the circuit. Data can be measured by the circuit, stored in memory associated with the circuit, and then used by the circuit to estimate a probability of failure of the circuit within a future period of time.

The described circuits and techniques may be used with a wide variety of functional circuits designed for a wide variety of different circuit functions. The techniques and circuits described in this disclosure may provide predictive alerts that can predict future circuit problems before the problems occur in functional circuits. In this way, system maintenance can be identified and performed (e.g., to replace functional circuits within a larger system) before the circuits exhibit actual problems or failure. The circuits and techniques of this disclosure may promote safety and reliability in devices or systems, such as in a vehicle or a similar setting.

In one example, this disclosure describes a circuit comprising: a function unit configured to perform a circuit function; a memory configured to store stress data associated with use of the circuit, wherein the stress data includes one or more stress origination metrics measured during use of the circuit, one or more stress victim events identified during use of the circuit, and one or more initial state conditions associated with manufacturing the circuit; and a failure prediction unit configured to estimate a probability of failure of the circuit based on the one or more stress origination metrics, the one or more stress victim events, and the one or more initial state conditions.

In another example, this disclosure describes a method of operating a circuit, the method comprising: performing a circuit function; and estimating a probability of failure of the circuit based on one or more stress origination metrics, one or more stress victim events, and one or more initial state conditions.

The details of one or more examples are set forth in the accompanying drawings and the description below. Other features, objects, and advantages will be apparent from the description and drawings, and from the claims.

DETAILED DESCRIPTION

This disclosure describes techniques and circuits for assessing aging effects in circuits and for predicting future problems in circuits before the problems actually occur. This disclosure also describes techniques and circuits for promoting circuit safety and reliability. The described circuits and techniques may be used with a wide variety of circuits designed for a wide variety of different circuit functions. The circuits and techniques may promote safety and reliability in devices or systems, such as in a vehicle or a similar setting. Modern vehicles and other modern devices or systems may include a large number of functional circuits, and monitoring the health or operational safety of any of a wide variety of functional circuits is desirable to promote safety and reliability vehicles or other devices or systems.

The described circuits and techniques may estimate a probability of failure of the circuit based on data associated with the circuit. The data, for example, may include one or more stress origination metrics associated with the circuit, one or more stress victim events associated with the circuit, and one or more initial state conditions associated with the circuit. Data can be measured by the circuit, stored in memory associated with the circuit, and then used by the circuit to estimate a probability of failure of the circuit within a future period of time.

The initial state conditions associated with the circuit may be stored in a memory associated with the circuit when the circuit is manufactured. The stress origination metrics may comprise measured quantities or parameters associated with the circuit that may originate stress for the circuit. Stress victim events may comprise measured events associated with the circuit.

In some examples, the techniques and circuits described in this disclosure may provide predictive alerts that can predict circuit problems before the problems occur in a functional circuit. In this way, system maintenance can be identified and performed (e.g., to replace a circuit in the system) before the circuit exhibits actual problems or failure. Moreover, in some cases, the techniques and circuits of this disclosure for predicting future problems in a circuit may be used in combination with other techniques that detect or monitor for actual circuit problems that may currently exist. Accordingly, the techniques of this disclosure may generate system alerts in response to identifying actual existing problems with a functional circuit, and the techniques of this disclosure may also generate predictive system alerts to predict future problems with the functional circuit (e.g., to prompt anticipatory maintenance on the system).

Figure 1:
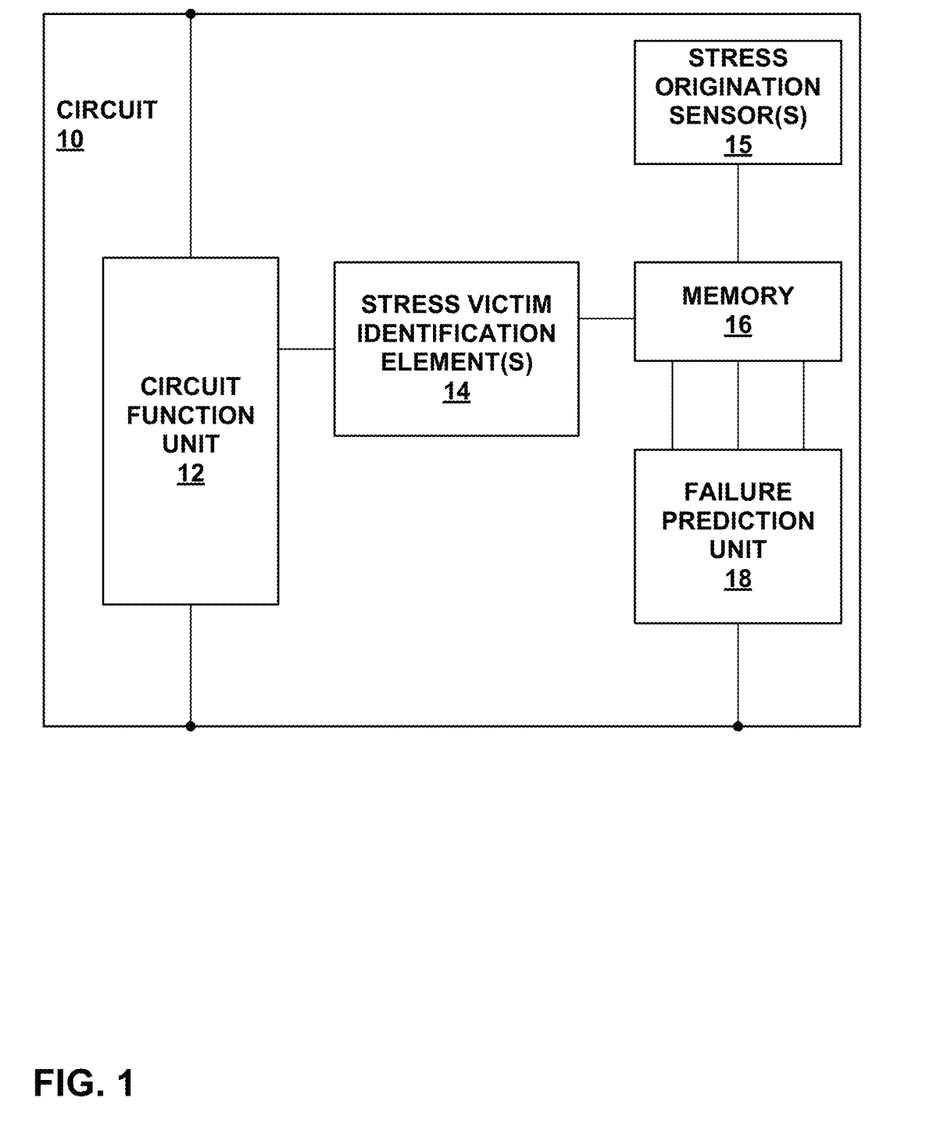
FIG. 1 is a block diagram showing a circuit according to an example of this disclosure.

FIG. 1 is a block diagram of a circuit 10 (e.g., an integrated circuit) that comprises a circuit function unit 12 configured to perform a circuit function. Circuit function unit 12, for example, may comprise any of a wide variety of circuits used in a larger system. For example, circuit function unit 12 may comprise a driver circuit configured to drive a load. In another example, circuit function unit 12 may comprise a logic circuit configured to perform one or more logic functions. In another example, circuit function unit 12 may comprise a motor driver configured to drive a motor such as a multi-phase motor. In another example, circuit function unit 12 may comprise an oscillator circuit configured to generate an oscillating signal. In another example, circuit function unit 12 may comprise a level shifter circuit configured to shift or change the voltage level of a signal. In another example, circuit function unit 12 may comprise a phase shift circuit configured to shift the phase of a signal. In another example, circuit function unit 12 may comprise a phase locked loop circuit configured to provide an output signal having a phase that is based on the input signal. In another example, circuit function unit 12 may comprise an analog-to-digital converter (ADC) circuit configured to convert an analog signal to a digital signal. In another example, circuit function unit 12 may comprise a digital-to-analog converter (DAC) circuit configured to convert a digital signal to an analog signal. In another example, circuit function unit 12 may comprise an arithmetic logic unit (ALU) configured to perform an arithmetic function. In still other examples, circuit function unit 12 may comprise a processor, a microcontroller, a digital signal processor (DSP), a communication interface circuit such as a serial peripheral interface (SPI) or another type of communication interface circuit, a digital logic circuit, a state machine, a signal processing circuit, a control circuit, an analog function circuit, a memory circuit, a sensor, a sensor combined with at least a part of its readout and signal processing circuit, a communication interface or any other circuit configured to perform one or more circuit functions.

Circuit 10 also includes a memory 16 associated with circuit 10. Memory 16 may be configured to store stress data associated with use of the circuit, wherein the stress data includes one or more stress origination metrics measured during use of the circuit. In addition, memory 16 may be configured to store one or more stress victim events identified during use of the circuit. Furthermore, memory 16 may also be configured to store one or more initial state conditions associated with manufacturing the circuit.

Stress origination sensors 15 may comprise one or more sensors that are configured to determine (e.g., measure) the stress origination metrics during use of circuit 10. Stress victim identification elements 14 may comprise one or more elements that are configured to identify stressful circuit events within circuit function unit 12 during use of circuit 10. Initial state conditions may comprise one or more data elements that define an initial state of circuit 10, e.g., manufacturing data associated with circuit 10.

As shown in FIG. 1, circuit 10 includes a failure prediction unit 18. Failure prediction unit 18 may be configured to estimate a probability of failure of circuit 10 (e.g., estimate a probability of failure of circuit function unit 12) based on the one or more stress origination metrics, the one or more stress victim events, and the one or more initial state conditions stored in memory 16.

In some examples, stress victim identification elements 14 may comprise one or more counters configured to count a number of stress victim events that occur in circuit function unit 12. In some examples, stress victim events may comprise a detected frequency change associated with a ring oscillation circuit (not shown). A ring oscillation circuit, for example, may be included within circuit 10 or otherwise associated with circuit 10, and used as a proxy to circuit 10 for the purpose of tracking aging or wear of circuit 10. A detected frequency change in such as oscillation circuit may define a stress victim event for circuit 10, according to some examples of this disclose.

In some examples, stress victim events may comprise a failure event associated with circuit 10, such as an error correction code (ECC) event associated with circuit function unit 12. For example, any time an ECC is applied within circuit function unit 12 in a way that changes or "corrects" a value, this ECC event may indicate the existence of stress in circuit 10, and therefore, a count of ECC events may be indicative or circuit stress. In this case, for example, stress victim identification elements 14 may include a counter that counts ECC events. In yet another example, stress victim events may comprise a timing drift associated with circuit function unit 12, which may be measured by stress victim identification elements 14.

The one or more stress origination metrics measured by stress origination sensors 15, for example, may comprise one or more measurements associated with circuit 10. The measurements, for example, may comprise a measured temperature associated with circuit 10, a measured humidity associated with circuit 10, a measured current associated circuit 10, a measured voltage associated with the circuit 10 (such as a supply voltage), a measured switching frequency associated with a switch within the circuit 10, a measured clock frequency associated with circuit 10, or a measured operating time associated with circuit 10. More specifically, in some examples, the measurements that define stress origination metrics may comprise a measured temperature associated with circuit function unit 12, a measured humidity associated with circuit function unit 12, a measured current associated circuit function unit 12, a measured voltage associated with the circuit function unit 12 (such as a supply voltage), a measured switching frequency associated with a switch within the circuit function unit 12, a measured clock frequency associated with circuit function unit 12, or a measured operating time associated with circuit function unit 12.

The initial state conditions stored within memory 16, for example, may include initial state conditions measured for circuit 10 (e.g., for circuit function unit 12) during a manufacturing process of circuit 10. For example, the initial state conditions may include acceptability statistics associated with manufacturing of a batch of circuits, wherein circuit 10 is part of the batch of circuits. Alternatively or additionally, the initial state conditions may include distribution information of the circuit relative to a batch of circuits, wherein circuit 10 is part of the batch of circuits.

Failure prediction unit 18 may be configured to estimate a probability of failure of circuit 10 (e.g., estimate a probability of failure of circuit function unit 12) based on the one or more stress origination metrics, the one or more stress victim events, and the one or more initial state conditions stored in memory 16. The estimated probability of failure may be defined over a specific period of future time, e.g., a fixed time window or a variable time window defined based on other factors, such as prior usage of circuit 10 within a larger system. The estimated probability of failure of circuit function unit 12, for example, may be used to determine whether predictive maintenance is needed on circuit function unit 12 during the specific period of future time, i.e., before circuit failure is likely to occur.

In some examples, failure prediction unit 18 is configured to output an alert in response to identifying that the probability of failure of circuit 10 (e.g., a probability of failure of circuit function unit 12) is greater than a threshold. Alternatively or additionally, failure prediction unit 18 may be configured to disable at least a portion of circuit 10 in response to identifying that the probability of failure is greater than a threshold.

An alert from failure prediction unit 18, for example, may comprises a predictive maintenance alert sent to another circuit, such as an electronic control unit (ECU), a system-level microprocessor, or any external system-level circuit. Based on the predictive maintenance alert, a larger system may schedule, suggest, or require maintenance on circuit 10 or circuit function unit 12, e.g., before failure of circuit 10, and/or before any actual safety issues occur due to stress and aging of circuit 10.

Figure 2:
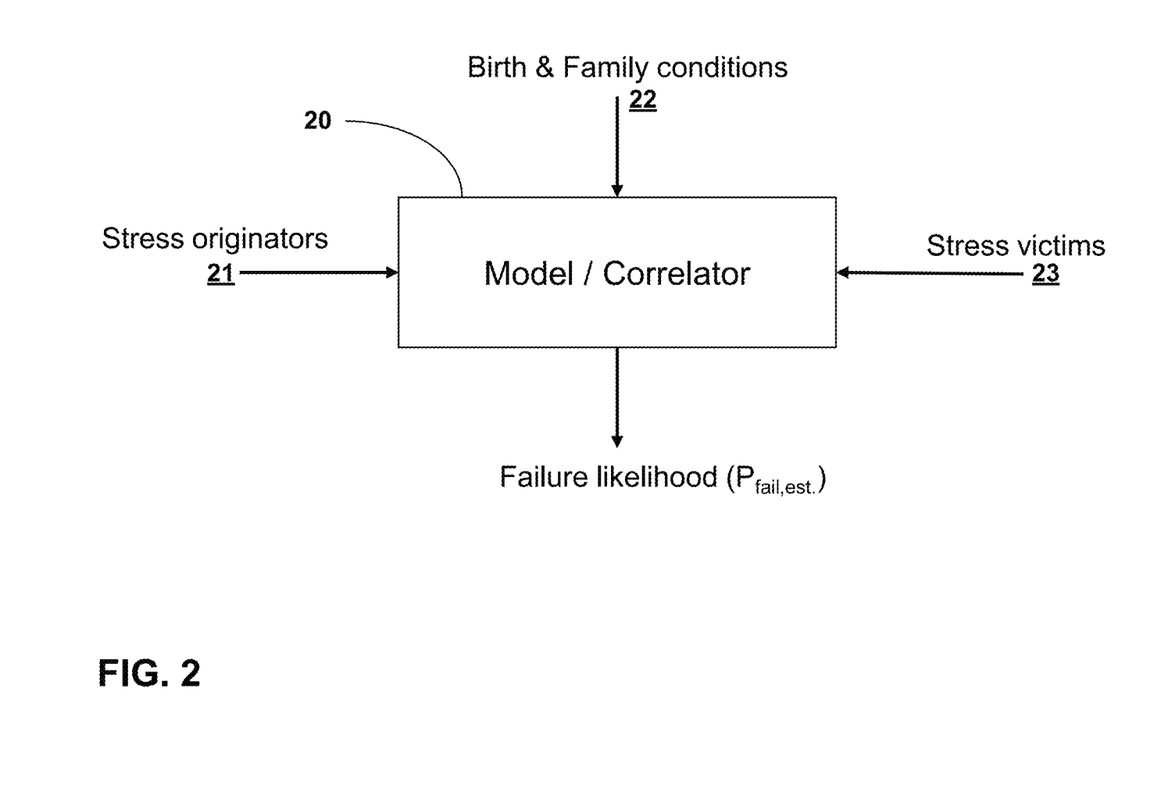
FIG. 2 is a block diagram showing operation of a model correlator unit, which may correspond to a failure prediction unit according to some examples of this disclosure.

FIG. 2 is a block diagram showing operation of a model correlator unit 20, which may correspond to failure prediction unit 18 (or a portion of failure prediction unit 18) of FIG. 1. As shown, model correlator unit 20 uses three different inputs of information to determine a probability of failure ($P_{fail\ est}$). The three different inputs comprise stress originators 21, birth and family conditions associated with the circuit 22, and stress victim events 23.

Stress originators 21 may comprise sensed or measured conditions associated with the circuit (e.g., measured conditions associated with circuit function unit 12 of circuit 10), such as measured temperature, measured humidity, measured voltage, measured switching frequency, measured clock frequency, measured operating time, or another measured parameter. Birth and family conditions 22 may include initial state conditions that define an initial state of circuit 10 when manufactured. For example, birth and family conditions 22 may include acceptability statistics associated with manufacturing of a batch of circuits and/or distribution information of the circuit relative to the batch of circuits manufactured on the same silicon wafer. A probability of failure of any given circuit, for example, may correlate with the number of failed circuits on the same silicon wafer in the manufacturing stage, and therefore, this information can be useful in determining the probability of failure ($P_{fail\ est}$) of a given circuit during operation in the field.

Stress victim events 23 may comprise identified stressful circuit events within circuit function unit 12 during use of circuit 10. Stress victim events 23, for example, may comprise an identified frequency change associated with a ring oscillation circuit, a failure event associated with circuit function unit 12, such as an ECC event where data is corrected by an ECC, an identified timing drift associated with circuit function unit 12, or another stress-causing event that can be determined and identified within circuit 10. Model correlator unit 20 uses these three different inputs (e.g., stress originators 21, birth and family conditions associated with the circuit 22, and stress victim events 23) to determine a probability of failure ($P_{fail\ est}$). The three different inputs, for example, may be stored in memory 16 to facilitate use of this information in calculating the probability of failure ($P_{fail\ est}$).

Lifetime reliability of semiconductor circuits has become a crucial aspect of the growing electronic systems, e.g., in automobiles and other modern system. As system are continuously used the systems can fail in various ways. Different failure mechanisms of circuits, for example, may include stuck-at failures, transient failures, intermittent failures, or other circuit problems or failures. However, it is not necessarily predetermined when a given semiconductor chip will fail. Rather, circuit failure can depend on different characteristics of the circuit, such as the mission profile, its manufacturing, and its actual use. A system circuit that is continuously used in high temperature environments, for example, may be more susceptible to failures compared to a seldomly used circuit operating at room temperature.

In some examples, the techniques of this disclosure can predict the likelihood (or probability) of a system to fail in the future, by correlating and combining three different kind of inputs:
1. Stress causing variables (e.g., Stress originators 21)
2. Stress dependent variables (e.g., Stress victims 23)
3. Initial state (e.g., Birth & family conditions 22)

Stress originators 21 may comprise lifetime measures of variables which are known to cause stress in a circuit or system. Again, stress originators 21 may comprise such things as:
Temperature
Humidity
Supply voltage
Activity (e.g. data switching frequency at selected points)
Clock frequency
Current at one or more nodes
Voltage at one or more nodes
Other measured quantities known to cause stress Stress victims 23 may comprise measured changes in circuit operation, e.g., measured changes or drift in one or more circuit parameters. Again, stress victims 23 may comprise such things as:
A change in ring oscillator frequency, e.g., of a ring oscillation circuit included within or associated with circuit 10.
Failure counts in the system (e.g. ECC failures or statistics from other safety mechanisms)
Timing drift (e.g. from critical path monitors)

As shown in FIG. 2, model correlator unit 20 uses three different inputs of information 21, 22, 23 to determine a probability of failure ($P_{fail\ est}$). The probability of failure ($P_{fail\_est}$) may comprise a value or percentage indicating a likelihood of failure within a defined period of time in the future. In other words, the probability of failure ($P_{fail\_est}$) may indicate the likelihood of failure within a future window of time. If the likelihood of failure exceeds a threshold within that future window of time, predictive maintenance on circuit 10 may be recommended, scheduled, or required within the larger system. The future window of time may be fixed and pre-defined, or it may be defined based on one or more factors associated with circuit 10, such as the age or prior usage of circuit 10 within a larger system.

Figure 3:
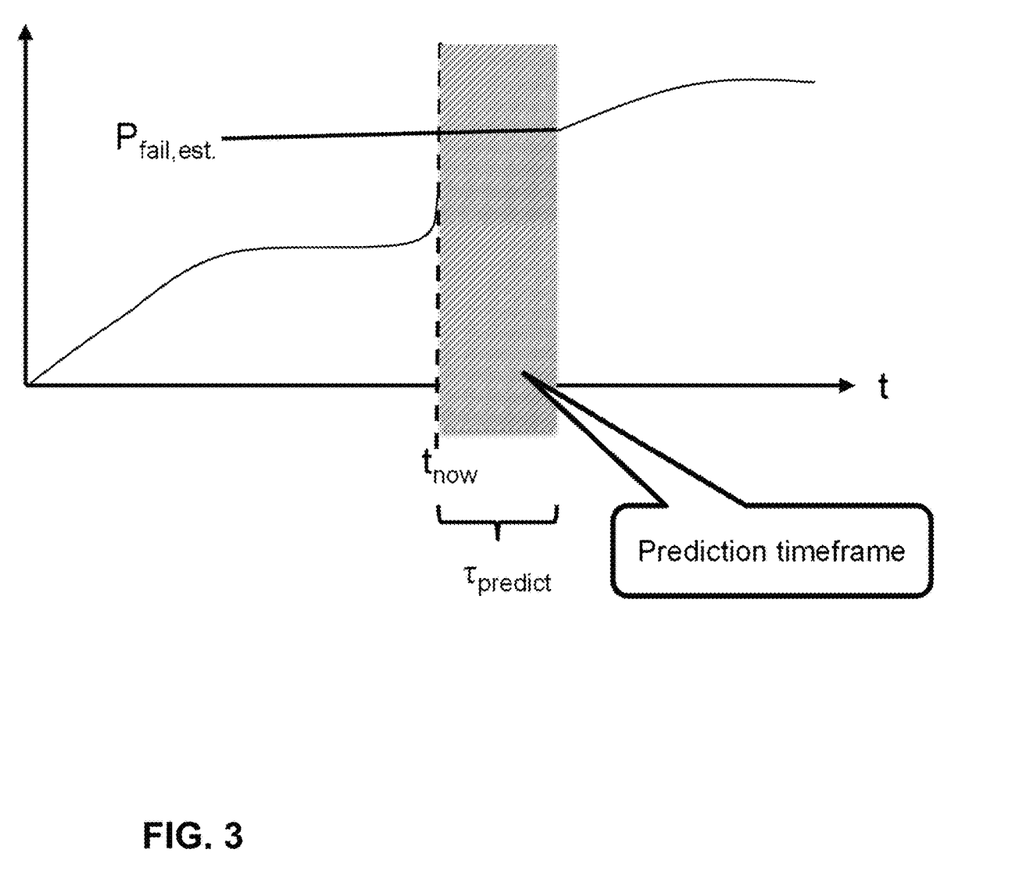
FIG. 3 is graph illustrating a prediction timeframe in which a circuit may estimate a probability of failure.

FIG. 3 is graph illustrating a prediction timeframe in which a circuit (e.g., circuit 10) may estimate a probability of failure. As shown, the probability of failure ($P_{fail\_est}$) is defined within a specific window of time (e.g., τ predict). The likelihood of failure may continue to increase, as shown in FIG. 3 for times beyond the prediction timeframe, but the prediction timeframe may define a useful window of circuit operation useful for predicting circuit health within that timeframe.

Figure 4A:
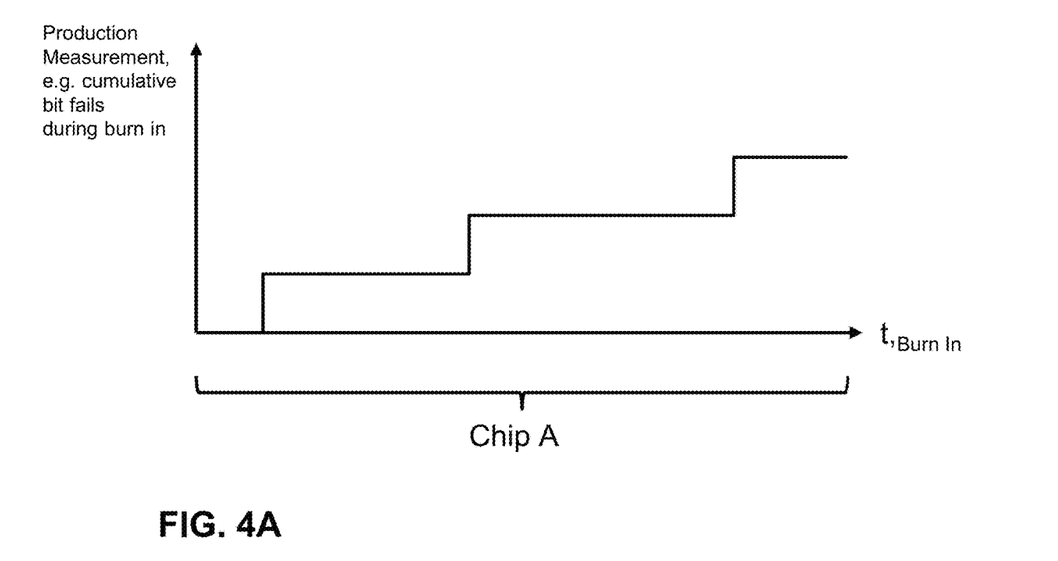
FIGS. 4A and 4B are graphs showing some example production measurements associated to two different example circuits (e.g., semiconductor chips).
Figure 4B:
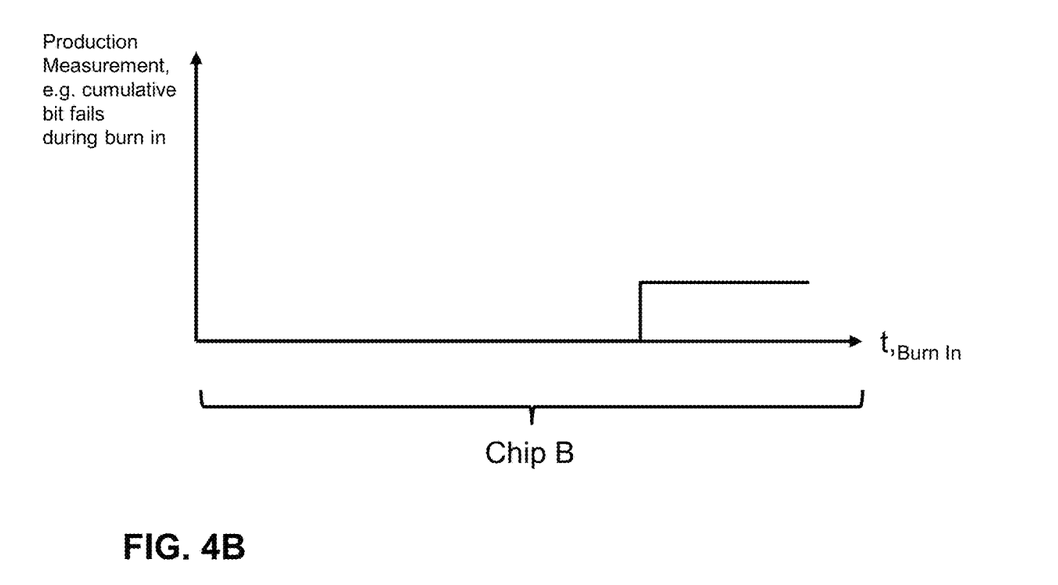

FIGS. 4A and 4B are graphs showing some example production measurements associated to two different example circuits (e.g., semiconductor chips). In some examples, information similar to that shown in FIGS. 4A and 4B can be used as birth and family information 22. Specifically, FIGS. 4A and 4B demonstrate birth conditions that may be useful in predicting future circuit health and longevity.

Birth conditions of a circuit may be indicative of system health at the manufacturing stage. Birth conditions may include variables and states measured during a manufacturing test, such as during burn in of the chip. So-called "burn in" may refer to circuit testing, such as accelerated stress tests performed on chips. The drift of a chip during the burn in timeframe, hence, may be indicative of chip lifetime behavior. For example, a chip which affected more during burn in testing of applied stress (but still within its specified limits) could be more susceptible to stress during its lifetime than chips that are less effected. Of course, this stress susceptibility may also depend on the actual operational conditions of the chip.

As shown in FIG. 4A relative to FIG. 4B, chip A of FIG. 4A exhibits more bit fails during a burn in manufacturing process than chip B of FIG. 4B. Therefore, although chip A may still pass testing during the burn in manufacturing process, chip A may be more susceptible to stress than chip B when in the presence of stress originators and/or stress originating events. This is due to the fact that chip A exhibits more bit fails during a burn in manufacturing process than chip B.

Figure 5:
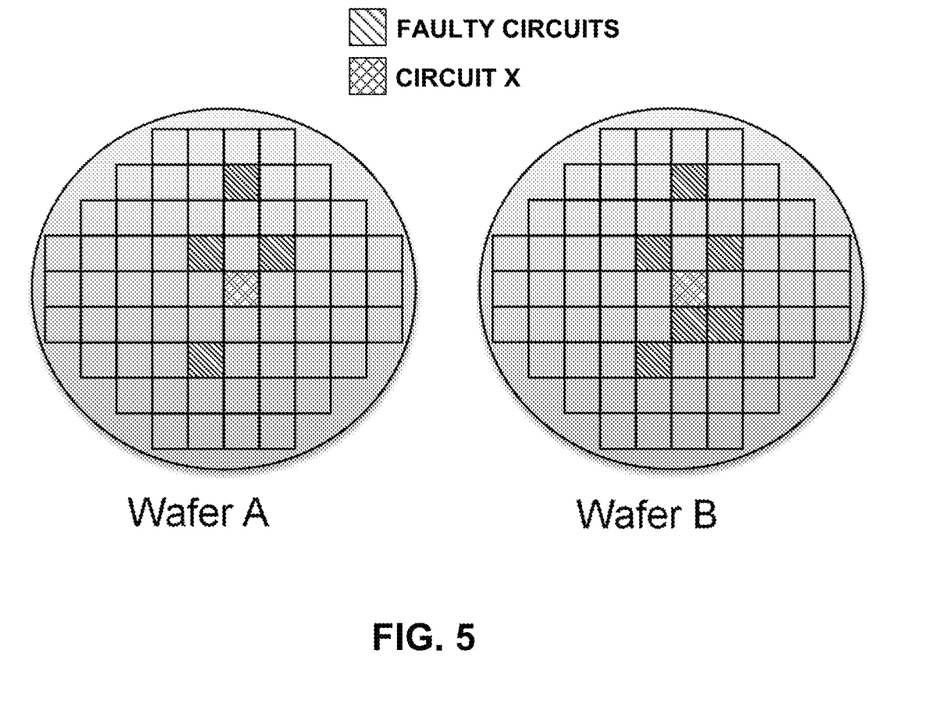
FIG. 5 is a conceptual diagram showing a so-called family comparison between circuits manufactured in two different wafers.

As shown in FIG. 5, circuit X within wafer A may be less susceptible to stress than circuit X within wafer B. This is due to the fact that wafer B exhibits more faulty circuits than wafer A. Circuit X from wafer A, therefore, may be more reliable and less susceptible to stress than circuit X within wafer B. This birth information, i.e., a metric indicative of the percentage of faulty "sibling" circuits within a given wafer of manufactured circuits, may define birth conditions useful in predicting future circuit life during circuit operation.

Moreover, family conditions associated with a given circuit may also correlate with circuit health and longevity. In some examples, the "birth conditions" are recorded for all samples from a lot, wafer, or other set of circuits with similar manufacturing steps. Moreover, birth conditions can be stored in memory 16 associated with each given circuit. For example, if more spatially close neighbors of the chip are screened out during burn in the chip, that chip may have a higher likelihood to fail during its lifetime compared to a chip where all its spatially close neighbors on the same wafer pass the manufacturing screening. Hence, family conditions can be seen as a representative variable for predicting future circuit life.

Further examples of such birth or family condition parameters may include a given chip parameter position within the parameter distribution of multiple dies, parameter variations like threshold voltage or current desaturation levels (Idsat), e.g. determined via manufacturing test results, repair statistics of the chip, e.g., a number of repaired cells of a memory circuit, or other manufacturing statistics associated with any given chip.

In FIG. 5, the boxes labeled with diagonal cross-hashing may define faulty circuits that are screened during manufacturing process, e.g. during burn in. The boxes labeled with X-hashing identifies the circuit being modeled. As shown in FIG. 5, circuit X within wafer A may be less susceptible to stress than circuit X within wafer B. This is due to the fact that wafer B exhibits more faulty circuits than wafer A. Circuit X from wafer A, therefore, may be more reliable and less susceptible to stress than circuit X within wafer B. A metric indicative of the relative number of faulty circuits on the wafer or lot of manufactured circuits may define an initial state condition, birth condition, or family condition, according to this disclosure.

Additional examples of variables measured to define family conditions may include:

Birth conditions of "sibling" chips compared to the specific chip instance under consideration. Sibling chips may refer to chips that come from the same wafer Screened out "sibling" chips during manufacturing as not meeting device specifications or containing manufacturing defects Family conditions of a given circuit may also consider factors such as:

The spatiality of the correlated chips, i.e., data from sibling chips which are closer on the wafer to a given chip may be assigned a higher weight than data of sibling chips that are spatially further from the given chip.

The representativeness of these chips, e.g. for multiple wafers in one lot may be limited in some situations. It may be the case that some chips within a wafer or lot may receive special additional processing steps in the manufacturing (e.g. delayering and reprocessing one layer), and hence, correlating the chips from this wafer to other wafers in the same lot may be less representative when such additional processing steps are performed.

In some example, birth and family information 22 may include wafer and lot information or a metric indicative of failure statistics of a wafer or lot. Sibling chips on the same wafer may define a first order relationship with high correlation in family information. Sibling chips in a same lot may define a second order relationship with some correlation in family information. By using statistics of both the wafer and the lot of a given circuit, modeling of that circuit and predicting circuit life can be improved.

According to techniques of this disclosure, a circuit customer (e.g., an automobile manufacturer) creating a larger system (e.g., a vehicle), can be equipped with circuit-based predictions chip failure in the future. The prediction may be independent of specific protected points (e.g. safety mechanisms), but may provide a general prediction of the likelihood of future chip failure. The predictions may be especially useful for chips likely to experience intermittent failures due to the experience of accumulated stress over time.

The techniques of this disclosure can provide a prediction of chip failure by correlating and combining three different types of conditions in the system:
  Stress initiators
  Stress victims
  Initial conditions after manufacturing In various examples, the combination of these inputs may come from a dedicated fitted model, experimental data, artificial intelligence approaches (e.g. neural networks), or a combination of these or other approaches. In these or other examples, the techniques of this disclosure may account for the initial conditions of the specific chip and its family members created in the same wafer or lot, e.g., based on measurements of the circuits after manufacturing (which may be so-called "birth conditions"). The techniques may also account for the quality of the manufacturing of a chip and its family members by measuring and storing metrics associated with neighboring circuits in the same wafer or lot (which may be so-called "family conditions").

Figure 6:
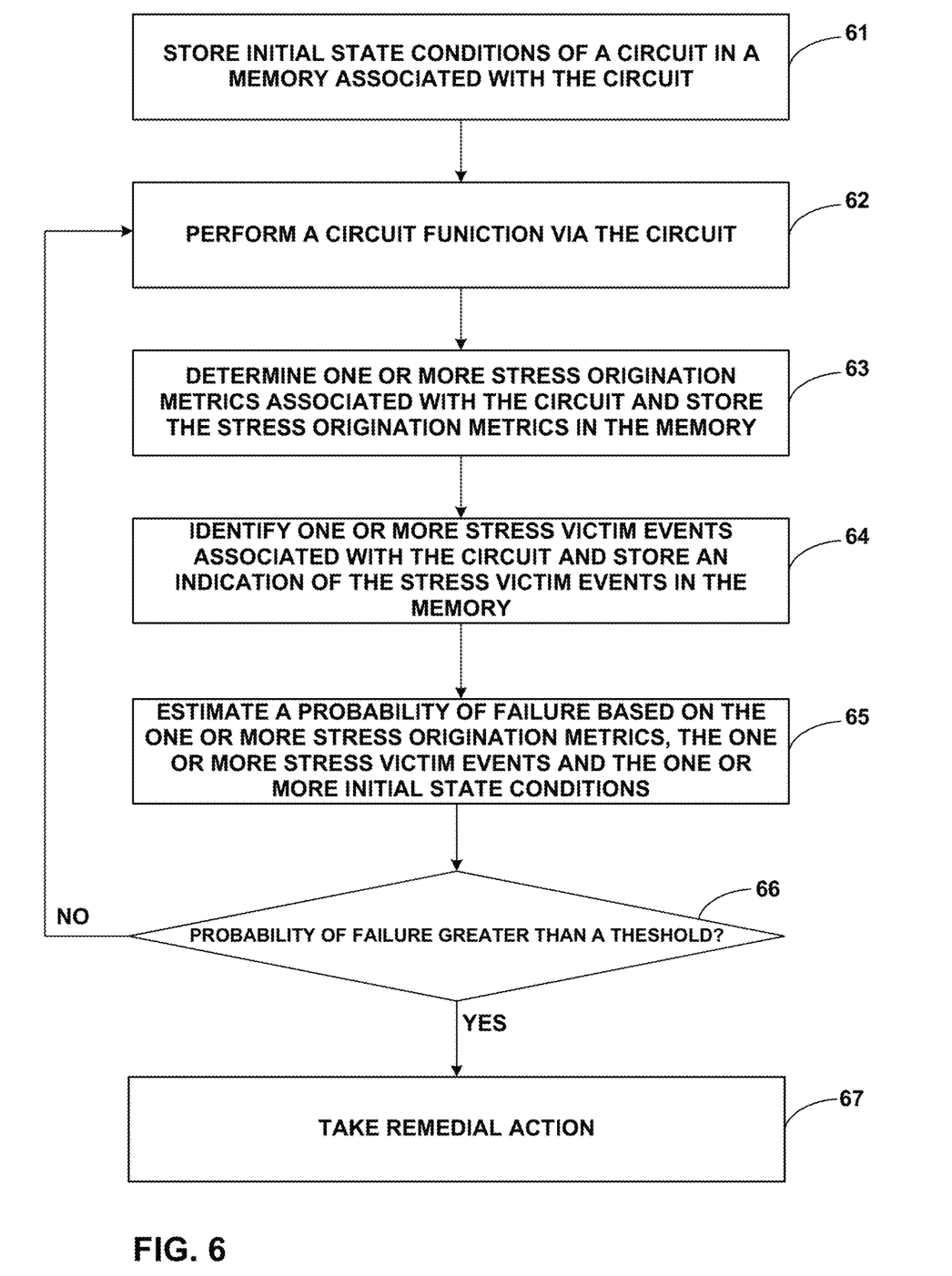
FIG. 6 is a flow diagram showing operation of a circuit according to an example of this disclosure.

FIG. 6 is a flow diagram showing operation of a circuit according to an example of this disclosure. FIG. 6 will be described from the perspective of circuit 10 of FIG. 1, although other circuits could also perform the techniques. As shown in FIG. 6, circuit 10 stores initial state conditions of circuit 10 in a memory 16 associated with circuit 10 (61). Circuit function unit 12 performs a circuit function 12 (62). Stress origination sensor(s) 15 determine one or more stress origination metrics (e.g. temperature, humidity, voltage, current, or other measurements) associated with circuit function unit 12 and store the stress origination metrics in memory 16 (62). Stress victim identification elements 14 identify one or more stress victim events associated with circuit 10 (e.g., events within circuit function unit 12) and store an indication of such stress victim events in memory 16 (64).

Based on the information stored in memory 16, failure prediction unit 18 estimates a probably of failure (65). In particular, failure prediction unit 18 estimates a probably of failure based on the one or more stress origination metrics, the one or more stress victim events, and the one or more initial state conditions (65).

As further shown in FIG. 6, in some examples, failure prediction unit 18 may determine whether the probability of failure of circuit 10 (or circuit function unit 12) is greater than a threshold (66). This determination (66) may be based on a probability value indicative of the probability that circuit 10 or circuit function unit 12 will fail within a specific window of time (e.g., within T predict shown in FIG. 3).

In response to identifying that the probability of failure of circuit 10 or circuit function unit 12 is greater than a threshold (yes branch of 66), failure prediction unit 18 may be configured to initiate remedial action for circuit 10 (67). Remedial action (67), for example, may comprise outputting an alert or fault, disabling circuit 10, disabling circuit function unit 12, disabling one or more components of a larger system, or other actions to promote safety or reliability in a larger system. In some examples, failure prediction unit 18 may be configured disable some or all of circuit 10 (e.g., disable circuit function unit 12) in response to the probability of failure being than a threshold. In some examples, failure prediction unit 18 may be configured to issue an alert in response to the probability of failure being than a threshold. An alert from failure prediction unit 18, for example, may comprises a predictive maintenance alert sent to another circuit, such as an ECU, a system-level microprocessor or any external system-level circuit. Based on the predictive maintenance alert, a larger system may schedule, suggest, or require maintenance on circuit 10 or circuit function unit 12, e.g., before the failure occurs and/or before any actual safety issues occur due to aging, stress, or overuse of circuit 10.

In some examples, in order to achieve an integrated circuit with integrated failure prediction monitoring features according to this disclosure, circuit 10 of FIG. 1 may be housed within a molding compound. In other words, circuit function unit 12, stress victim identification element(s) 14, stress origination sensor(s) 15, memory 16 and failure prediction unit 18 may all reside within a molding compound of a circuit package. Alternatively, in other examples, one or more of circuit function unit 12, stress victim identification element(s) 14, stress origination sensor(s) 15, memory 16 and failure prediction unit 18 may comprise separate circuit packages that are assembled to collectively form circuit 10. Again, however, by implementing circuit function unit 12, stress victim identification element(s) 14, stress origination sensor(s) 15, memory 16 and failure prediction unit 18 all within a molding compound of a circuit package, a self-contained functional circuit with integrated failure prediction monitoring functionality can be achieved.

In accordance with this disclosure, a method of operating circuit 10 may include performing a circuit function (62), estimating a probability of failure of the circuit based on one or more stress origination metrics, one or more stress victim events, and one or more initial state conditions (65). In some examples, the method may also include storing the one or more stress origination metrics, the one or more stress victim events, and the one or more initial state conditions in a memory 16 associated with the circuit 10. In some examples, the method may include determining the one or more stress origination metrics based on sensor data from one or more sensors 15 associated with the circuit. Moreover, in some examples, the method may include identifying the stress victim events via one or more circuit elements 14 associated with the circuit, such as one or more counters associated with circuit 10 or circuit function unit 12.

Again, as examples, the one or more stress origination metrics may comprise one or more measurements selected from a group consisting of: a measured temperature associated with circuit 10 or circuit function unit 12, a measured humidity associated with circuit 10 or circuit function unit 12, a measured current associated with circuit 10 or circuit function unit 12, a measured voltage associated with circuit 10 or circuit function unit 12, a measured switching frequency associated with a switch within circuit 10 or circuit function unit 12, a measured clock frequency associated with circuit 10 or circuit function unit 12, and a measured operating time associated with circuit 10 or circuit function unit 12.

Further, as examples, the one or more stress victim events may comprise one or more measured events selected from a group consisting of: a frequency change associated with a ring oscillation circuit associated with circuit 10 or circuit function unit 12; a failure event associated with circuit 10 or circuit function unit 12; and a timing drift associated with circuit 10 or circuit function unit 12.

Initial state conditions may include initial state conditions measured for circuit 10 or circuit function unit 12 during a manufacturing process, such as acceptability statistics associated with manufacturing of a batch of circuits, and/or distribution information of the circuit relative to the batch of circuits, wherein circuit 10 is part of the batch of circuits.

In some examples, methods performed by circuits of this disclosure may include outputting an alert in response to identifying that the probability of failure for the circuit is greater than a threshold. This type of alert may comprise a predictive maintenance alert that identifies one or more likely future circuit problems before the problems occur. In this case, the techniques of this disclosure may deliver predictive information about a circuit before the circuit fails so that maintenance can be performed in advance of such future circuit failure.

The following numbered clauses demonstrate one or more aspects of the disclosure.

Clause 1—A circuit comprising: a function unit configured to perform a circuit function; a memory configured to store stress data associated with use of the circuit, wherein the stress data includes one or more stress origination metrics measured during use of the circuit, one or more stress victim events identified during use of the circuit, and one or more initial state conditions associated with manufacturing the circuit; and a failure prediction unit configured to estimate a probability of failure of the circuit based on the one or more stress origination metrics, the one or more stress victim events, and the one or more initial state conditions.

Clause 2—The circuit of clause 1, further comprising one or more sensors configured to determine the one or more stress origination metrics.

Clause 3—The circuit of clause 1 or 2, further comprising one or more elements configured to identify the one or more stress victim events.

Clause 4—The circuit of clause 3, wherein the one or more elements configured to identify the one or more stress victim events comprise one or more counters configured to count a number of stress victim events.

Clause 5—The circuit of any of clauses 1-4, wherein the one or more stress origination metrics comprise one or more measurements selected from a group consisting of: a measured temperature associated with the circuit, a measured humidity associated with the circuit, a measured current associated with the circuit, a measured voltage associated with the circuit, a measured switching frequency associated with a switch within the circuit, a measured clock frequency associated with the circuit, and a measured operating time associated with the circuit.

Clause 6—The circuit of any of clauses 1-5, wherein the one or more stress victim events comprise one or more measured events selected from a group consisting of: a frequency change associated with a ring oscillation circuit; a failure event associated with the circuit; and a timing drift associated with the circuit.

Clause 7—The circuit of any of clauses 1-6, wherein the initial state conditions include initial state conditions measured for the circuit during a manufacturing process.

Clause 8—The circuit of clause 7, wherein the initial state conditions include acceptability statistics associated with manufacturing of a batch of circuits, wherein the circuit is part of the batch of circuits.

Clause 9—The circuit of clause 7 or 8, wherein the initial state conditions include distribution information of the circuit relative to a batch of circuits, wherein the circuit is part of the batch of circuits.

Clause 10—The circuit of any of clauses 1-9, wherein the failure prediction unit is configured to output an alert in response to identifying that the probability of failure is greater than a threshold.

Clause 11—The circuit of any of clauses 1-10, wherein the failure prediction unit is configured to disable at least a portion of the circuit in response to identifying that the probability of failure is greater than a threshold.

Clause 12—The circuit of any of clauses 1-11, wherein function unit comprises one or more circuit units selected from a group consisting of: a driver circuit; a logic circuit; a motor driver; a driver circuit for driving a load; an oscillator circuit; a level shifter circuit; a phase shift circuit; a phase locked loop circuit; an analog-to-digital converter circuit; a digital-to-analog converter circuit; an ALU; a processor; a microcontroller; a DSP; a communication interface circuit; a digital logic circuit; a state machine; a signal processing circuit; a control circuit; an analog circuit; or a memory circuit.

Clause 13—A method of operating a circuit, the method comprising: performing a circuit function; and estimating a probability of failure of the circuit based on one or more stress origination metrics, one or more stress victim events, and one or more initial state conditions.

Clause 14—The method of clause 13, further comprising: storing the one or more stress origination metrics, the one or more stress victim events, and the one or more initial state conditions in a memory associated with the circuit.

Clause 15—The method of clause 13 or 14, further comprising: determining the one or more stress origination metrics based on sensor data from one or more sensors associated with the circuit.

Clause 16—The method of any of clauses 13-15, further comprising: identifying the stress victim events via one or more circuit elements associated with the circuit.

Clause 17—The method of clause 16, wherein identifying the stress victim events comprising counting the stress victim events via one or more counters associated with the circuit.

Clause 18—The method of any of clauses 13-17, wherein the one or more stress origination metrics comprise one or more measurements selected from a group consisting of: a measured temperature associated with the circuit, a measured humidity associated with the circuit, a measured current associated with the circuit, a measured voltage associated with the circuit, a measured switching frequency associated with a switch within the circuit, a measured clock frequency associated with the circuit, and a measured operating time associated with the circuit.

Clause 19—The method of any of clauses 13-18, wherein the one or more stress victim events comprise one or more measured events selected from a group consisting of: a frequency change associated with a ring oscillation circuit; a failure event associated with the circuit; and a timing drift associated with the circuit.

Clause 20—The method of any of clauses 13-19, wherein the initial state conditions include initial state conditions measured for the circuit during a manufacturing process.

Clause 21—The method of clause 20, wherein the initial state conditions include acceptability statistics associated with manufacturing of a batch of circuits and distribution information of the circuit relative to the batch of circuits, wherein the circuit is part of the batch of circuits.

Clause 22—The method of any of clauses 13-21, further comprising outputting an alert in response to identifying that the probability of failure is greater than a threshold.

Various examples of the disclosure have been described. Any combination of the described systems, operations, or functions is contemplated. These and other examples are within the scope of the following claims.

What is claimed is:
1. A circuit comprising:
a function unit configured to perform a circuit function;

a memory configured to store stress data associated with use of the circuit, wherein the stress data includes one or more stress origination metrics measured during use of the circuit, one or more stress victim events identified during use of the circuit, and one or more initial state conditions associated with manufacturing the circuit; and a failure prediction unit configured to estimate a probability of failure of the circuit based on the one or more stress origination metrics, the one or more stress victim events, and the one or more initial state conditions.

2. The circuit of claim 1, further comprising one or more sensors configured to determine the one or more stress origination metrics.

3. The circuit of claim 1, further comprising one or more elements configured to identify the one or more stress victim events.

4. The circuit of claim 3, wherein the one or more elements configured to identify the one or more stress victim events comprise one or more counters configured to count a number of stress victim events.

5. The circuit of claim 1, wherein the one or more stress origination metrics comprise one or more measurements selected from a group consisting of:
a measured temperature associated with the circuit,
a measured humidity associated with the circuit,
a measured current associated with the circuit,
a measured voltage associated with the circuit,
a measured switching frequency associated with a switch within the circuit,
a measured clock frequency associated with the circuit, and
a measured operating time associated with the circuit.

6. The circuit of claim 1,
wherein the one or more stress victim events comprise one or more measured events selected from a group consisting of:
a frequency change associated with a ring oscillation circuit;
a failure event associated with the circuit; and
a timing drift associated with the circuit.

7. The circuit of claim 1, wherein the initial state conditions include initial state conditions measured for the circuit during a manufacturing process.

8. The circuit of claim 7, wherein the initial state conditions include acceptability statistics associated with manufacturing of a batch of circuits, wherein the circuit is part of the batch of circuits.

9. The circuit of claim 7, wherein the initial state conditions include distribution information of the circuit relative to a batch of circuits, wherein the circuit is part of the batch of circuits.

10. The circuit of claim 1, wherein the failure prediction unit is further configured to output an alert in response to identifying that the probability of failure is greater than a threshold.

11. The circuit of claim 1, wherein the failure prediction unit is further configured to disable at least a portion of the circuit in response to identifying that the probability of failure is greater than a threshold.

12. The circuit of claim 1, wherein function unit comprises one or more circuit units selected from a group consisting of:
a driver circuit;
a logic circuit;
a motor driver;
a driver circuit for driving a load;
an oscillator circuit;
a level shifter circuit;
a phase shift circuit;
a phase locked loop circuit;
an analog-to-digital converter circuit;
a digital-to-analog converter circuit;
an arithmetic logic unit (ALU);
a processor;
a microcontroller;
a digital signal processor (DSP);
a communication interface circuit;
a digital logic circuit;
a state machine;
a signal processing circuit;
a control circuit;
an analog circuit; or
a memory circuit.

13. A method of operating a circuit, the method comprising:
performing a circuit function; and
estimating a probability of failure of the circuit based on one or more stress origination metrics, one or more stress victim events, and one or more initial state conditions.

14. The method of claim 13, further comprising:
storing the one or more stress origination metrics, the one or more stress victim events, and the one or more initial state conditions in a memory associated with the circuit.

15. The method of claim 14, further comprising:
determining the one or more stress origination metrics based on sensor data from one or more sensors associated with the circuit.

16. The method of claim 14, further comprising:
identifying the stress victim events via one or more circuit elements associated with the circuit.

17. The method of claim 16, wherein identifying the stress victim events comprising counting the stress victim events via one or more counters associated with the circuit.

18. The method of claim 13, wherein the one or more stress origination metrics comprise one or more measurements selected from a group consisting of:
a measured temperature associated with the circuit,
a measured humidity associated with the circuit,
a measured current associated with the circuit,
a measured voltage associated with the circuit,
a measured switching frequency associated with a switch within the circuit,
a measured clock frequency associated with the circuit, and
a measured operating time associated with the circuit.

19. The method of claim 13,
wherein the one or more stress victim events comprise one or more measured events selected from a group consisting of:
a frequency change associated with a ring oscillation circuit;
a failure event associated with the circuit; and
a timing drift associated with the circuit.

20. The method of claim 13, wherein the initial state conditions include initial state conditions measured for the circuit during a manufacturing process.

21. The method of claim 20, wherein the initial state conditions include acceptability statistics associated with manufacturing of a batch of circuits and distribution information of the circuit relative to the batch of circuits, wherein the circuit is part of the batch of circuits.

22. The method of claim 13, further comprising outputting an alert in response to identifying that the probability of failure is greater than a threshold.

\* \* \* \* \*